United States Patent
Nishida (10) Patent No.: US 10,981,483 B2
(45) Date of Patent: Apr. 20, 2021

(54) ASSIST GRIP (71) Applicant: NIFCO INC., Yokosuka (JP)

(72) Inventor: Ryuhei Nishida, Yokosuka (JP)

(73) Assignee: NIFCO INC., Yokosuka (JP)

( * ) Notice: Subject to any disclaimer, the term of this patent is extended or adjusted under 35 U.S.C. 154(b) by 210 days.

(21) Appl. No.: 16/464,949

(22) PCT Filed: Dec. 7, 2017

(86) PCT No.: PCT/JP2017/044011
§ 371 (c)(1),
(2) Date: May 29, 2019

(87) PCT Pub. No.: WO2018/110425
PCT Pub. Date: Jun. 21, 2018

(65) Prior Publication Data
US 2020/0017010 A1    Jan. 16, 2020

(30) Foreign Application Priority Data
Dec. 14, 2016 (JP) .............................. JP2016-242575

(51) Int. Cl.
*B60N 3/02* (2006.01)
(52) U.S. Cl.
CPC ...................................... *B60N 3/02* (2013.01)
(58) Field of Classification Search
CPC .......... B60N 3/026; B60N 3/023; B60N 3/02; B60N 2/78; B60N 2/24; B60N 2/4235;
(Continued)

(56) References Cited

U.S. PATENT DOCUMENTS 6,594,862 B2 * 7/2003 Totani ................. B29C 45/1704
16/114.1
7,617,571 B2 * 11/2009 Lee ......................... B60N 3/023
16/412
(Continued)

FOREIGN PATENT DOCUMENTS

JP    H08-002547 A    1/1996
JP    3170454 B2      5/2001
(Continued)

OTHER PUBLICATIONS

PCT/ISA/210, "International Search Report for International Application No. PCT/JP2017/044011," dated Mar. 13, 2018.

*Primary Examiner* — D Glenn Dayoan
*Assistant Examiner* — Sunsurraye Westbrook
(74) *Attorney, Agent, or Firm* — Manabu Kanesaka (57) ABSTRACT

An assist grip includes a hollow molding member in which a grip main member is formed by a gas assist molding method, a holding portion, and concave storage portions provided to be connected to both longitudinal ends of the holding portion by interposing curved portions; and is attached to an attachment-face side by holding tools supported in both storage portions. Each of the storage portions is partitioned by an inner side wall and an outer side wall facing each other in a longitudinal direction; an upper wall connecting upper sides of the side walls at a curved-portion side; a lower wall connecting lower sides of the side walls at a terminal side; and a bottom wall connecting to both side walls and the upper and lower walls at an outer face side. The upper walls include inclined faces wherein inner faces on a storage-portion side are inclined toward a bottom-wall.

4 Claims, 11 Drawing Sheets (58) Field of Classification Search
CPC ...... B60N 2/42709; B60N 2/02; B60N 2/245;
B60N 2002/905
USPC ......... 296/1.02, 214, 146.7, 1.08, 62, 146.1,
296/152, 153, 187.05, 146.8; 16/110.1,
16/412, 429, 438, 422, 445, 421, 426,
16/436, 441; 280/730.2, 163, 728.2,
280/728.3, 164.1, 166, 727, 728.1
See application file for complete search history.

(56) References Cited

U.S. PATENT DOCUMENTS

| | | | |
|---|---|---|---|
| 7,934,760 B2 * | 5/2011 | Jagasia | B60N 3/026 |
| | | | 296/1.02 |
| 8,732,911 B2 * | 5/2014 | Kajio | B60N 3/026 |
| | | | 16/438 |
| 2002/0020042 A1 * | 2/2002 | Karachi | B60N 3/023 |
| | | | 16/438 |
| 2002/0070484 A1 * | 6/2002 | Davis, Jr. | B29C 45/0017 |
| | | | 264/572 |
| 2019/0111821 A1 * | 4/2019 | Yu | B60N 3/023 |

FOREIGN PATENT DOCUMENTS

| | | |
|---|---|---|
| JP | 2003-260969 A | 9/2003 |
| JP | 2003-312350 A | 11/2003 |
| JP | 2011-025762 A | 2/2011 |
| JP | 2013-043584 A | 3/2013 |

* cited by examiner

ASSIST GRIP

FIELD OF TECHNOLOGY

The present invention relates to an assist grip.

BACKGROUND ART

Figure 11A:
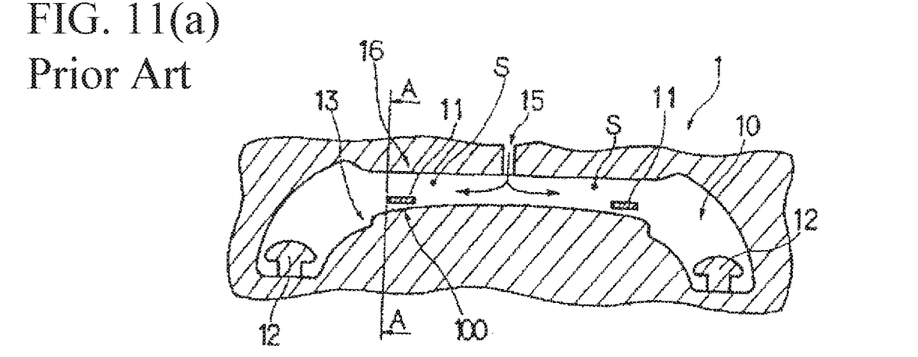
FIGS. 11(a) to 11(c) are explanatory views showing FIG. 1, FIG. 2, and FIG. 5 of Patent Document 1.
Figure 11B:
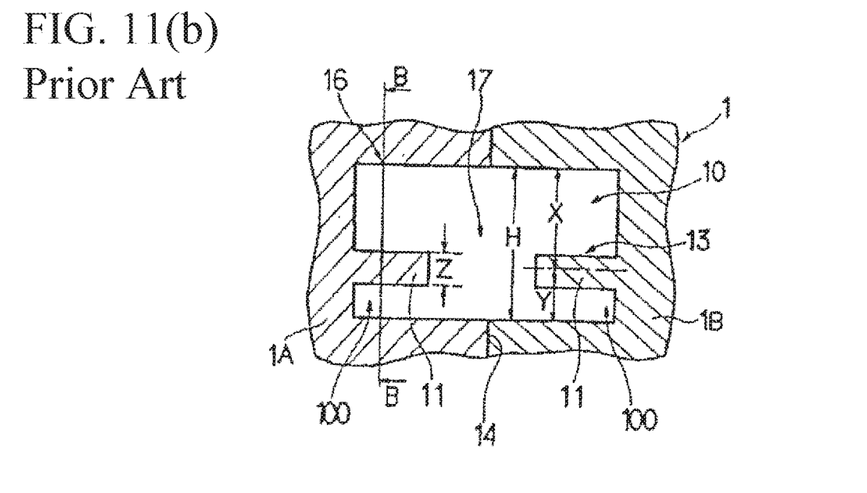
Figure 11C:
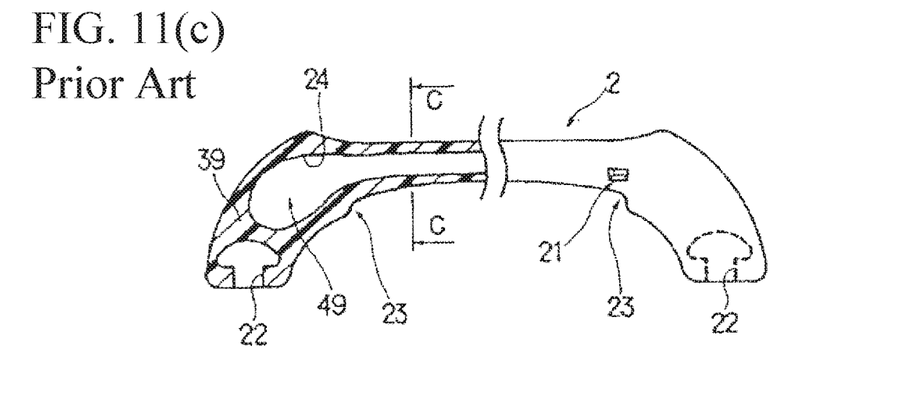

In the assist grip, as shown in illustrated examples in Patent Document 1 and 2, a grip main member is sometimes made as a hollow molding member in view of weight reduction, appearance characteristics, and the like. FIGS. 11(a) to 11(c) are disclosed in the Patent Document 1; the reference numeral 1 represents a forming die comprising right and left dies 1A and 1B; the reference numeral 2 represents a grip main member (an assist grip); the reference numeral 11 represents a weir; and the reference numeral 21 represents a concave portion formed by the weir 11. There, when the grip main member 2 including a curved portion (a bent portion) 23 is made by gas assist molding, injected gas passes through an inner circumferential side (an inside course) of the curved portion having a small flow resistance so as to have a tendency of generating a thin wall portion which becomes a factor lowering a strength in that direction, and conversely, have a tendency of forming a thick wall portion which becomes a factor generating a sink and the like on an outer circumferential side. As a countermeasure thereof, in the Patent Document 1, on a gas inflow side in the vicinity of the inside course (the inner circumferential side) of a curved-portion forming portion in the forming die 1, there is provided the weir 11 as shown in FIG. 11(b). Thereby, a resin injected around the weir 11 is cooled relatively rapidly, so that the injected gas flows into a molten resin which is not cooled yet between the weir and the outer circumferential side, i.e. the gas can be guided to an outer course (the outer circumferential side). As a result, the thin wall portion can be difficult to be formed on the aforementioned inner course side, and the thick wall portion can be difficult to be formed on an outer course side.

However, in the grip main member 2, the concave portion 21 is generated at a portion corresponding to the weir 11, so that an appearance declines, or a turbulent flow occurs due to the weir 11 inside the forming die so as to easily generate a silver Streak or a wrinkle.

Figure 12A:
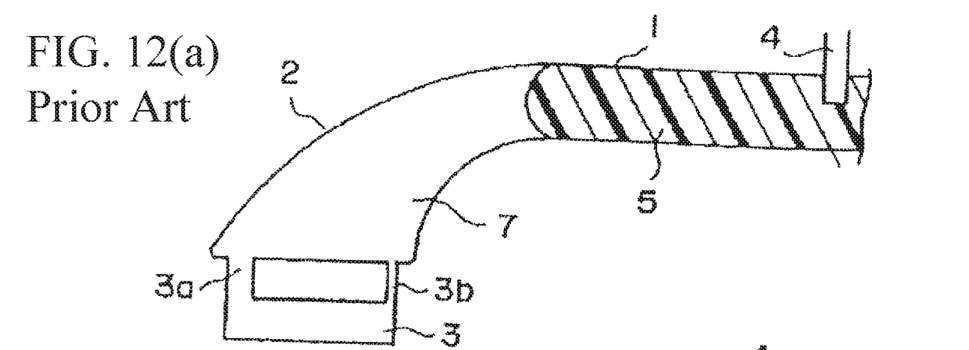
FIGS. 12(a) to 12(d) are explanatory views showing FIG. 3 of Patent Document 2.
Figure 12B:
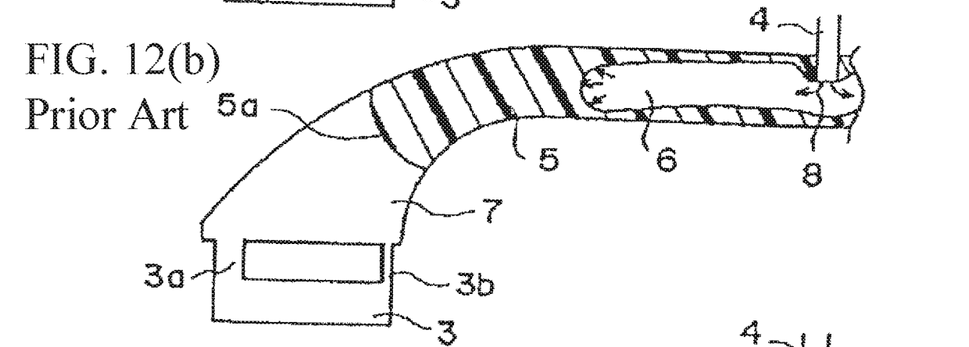
Figure 12C:
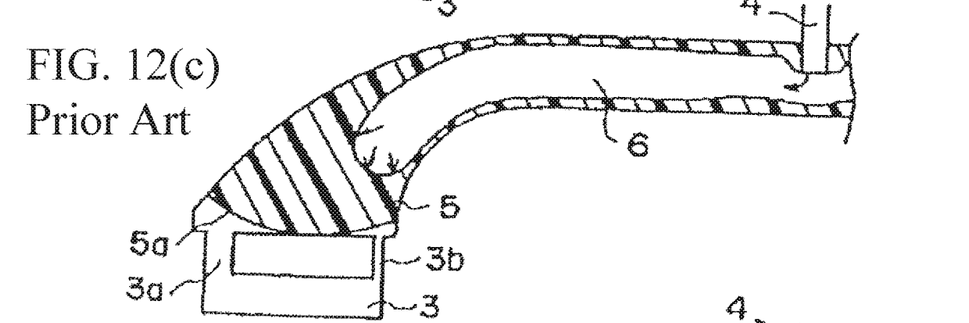
Figure 12D:
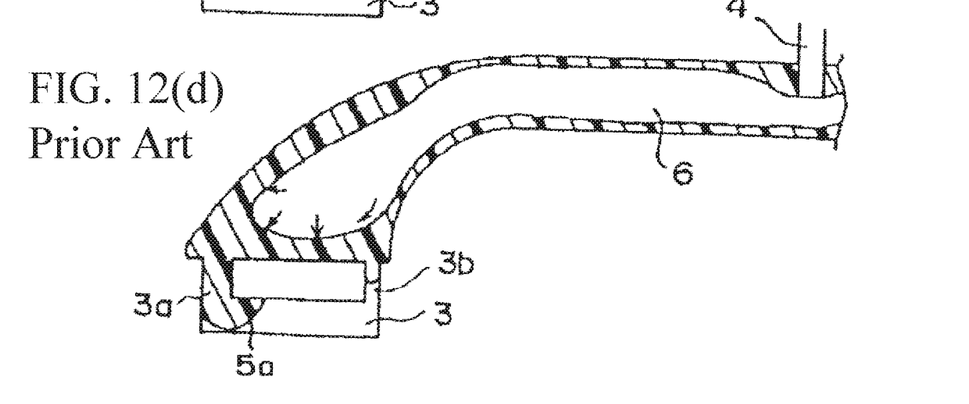

FIGS. 12(a) to 12(d) show processes of the gas assist molding in the Patent Document 2, wherein FIG. 12(a) shows a state wherein the resin is injected into a cavity 7; FIG. 12(b) shows a state wherein the gas is injected from a gas injection port 4; FIG. 12(c) shows a state wherein the resin is extruded by the injected gas, and is advancing inside the cavity; and FIG. 12(d) shows a state wherein the gas is guided to the outer circumferential side by a thick wall portion 3a. In the Patent Document 2, in order to prevent a problem which occurs in the Patent Document 1, in a gas injection molding method of the grip main member and the like comprising curved portions 2 curved at both end portions in a longitudinal direction of a main member portion 1, and an attachment portion 3 provided to be connected to end portions of the curved portions, when a hollow portion 6 is formed at the end portion of the curved portion 2 from the main member portion 1, a thick wall portion 3a guiding the gas to the outer circumferential side of the curved portion 2 is provided at a position provided to be connected to the end portion on the outer circumferential side of the curved portion of the attachment portion 3.

PRIOR ART DOCUMENTS

Patent Documents

Patent Document 1: Japanese Examined Patent Application Publication No. H08-2547
Patent Document 2: Japanese Patent No. 3170454

SUMMARY OF THE INVENTION

Problems to be Solved by the Invention

In the Patent Document 2, the injected gas is guided to the thick wall portion 3a side having the small flow resistance, i.e. in an outer circumferential direction of the hollow portion 6 of the curved portion, and pushes the molten resin in a direction of the attachment portion 3, so that the thick wall portion is not formed on the outer circumferential side of the curved portion 2, and the concave portion 21 such as the Patent Document 1 does not occur as well. As a result, an occurrence of the sink on a surface of the outer circumferential side of the curved portion 2 can be prevented, and the appearance can be improved. However, the aforementioned Patent Documents 1 and 2 are still unsatisfactory from the following viewpoints.

First, in the Patent Documents 1 and 2, for example, in order to reduce a use amount of a resin material further together with the weight reduction, even when the hollow portion is attempted to be enlarged, although a center portion of an approximately straight line portion, or a holding portion, and the curved portions on both sides thereof can be formed in the hollow portion with a predetermined rigidity, it is difficult to become hollowed up to an inside of a thickness of the attachment portion positioned at a terminal of the curved portion from the hollow portion further. In this respect, it is even more so, especially, when the attachment portion of the terminal of the curved portion has an aspect such as a concave storage portion as shown in an embodiment of the present invention. Also, in the grip main member of the Patent Documents 1 and 2, a hole which is made at a time of gas injection remains as a concaved shape at a center portion of a molded article in which the hole can be clearly viewed so as to be difficult to maintain the appearance.

In view of the aforementioned circumstances, an object of the present invention is to reduce a material cost together with the weight reduction by reducing the use amount of the resin material further while maintaining the appearance characteristics in a case wherein the grip main member is made as the hollow molding member by a gas assist molding method. Other objects will be clarified in the following explanation.

Means for Solving the Problems

In order to obtain the aforementioned objects, in the present invention, an assist grip comprises a hollow molding member in which a grip main member is formed by a gas assist molding method; integrally includes a holding portion, and concave storage portions provided to be connected to both longitudinal ends of the holding portion by interposing curved portions; and is attached to an attachment-face side by holding tools supported in the two storage portions. Each of the storage portions is partitioned by an inner side wall and an outer side wall facing each other in a longitudinal direction; an upper wall connecting upper sides of the two side walls at the curved-portion side; a lower wall connecting lower sides of the two side walls at a terminal side; and a bottom wall connecting to both side walls and the upper and lower walls at an outer face side, and the upper wall includes an inclined face where an inner face on the storage-portion side is inclined toward the bottom-wall side so as to gradually approach the lower wall, or an inclined face inclining toward the bottom wall between the inner face of the inner side wall and the inner face of the bottom wall.

In the aforementioned present invention, the "gas assist molding method" is called a gas assist injection molding method, a SIMPRESS molding method, and the like, and excels in weight reduction of a molded article, prevention of a sink, reduction of a warp, and the like. Characteristics of the gas assist molding method reside in that after injecting a molten resin into a cavity of a forming die, in an uncured state, gas (nitrogen, argon, and the like) which is pressurized (usually, approximately 50 to 200 kg/cm$^2$) is injected to make the hollow molding member by pressing the resin against a cavity surface while forming a gas passageway which becomes a hollow portion inside the molten resin. In a forming process, roughly, a short shot method and a full shot method are generally well-known. In the short shot method, the molten resin having an amount less than a cavity capacity (for example, 40 to 90 percent of the cavity capacity) is filled, and filling is completed mainly by enlarging bubbles. On the other hand, in the full shot method, the molten resin having an amount equal to the cavity capacity is filled, and a portion of solidification shrinkage thereof is mainly supplemented by generating the bubbles. It is preferable that the grip main member of the present invention is made by the short shot method compared to the full shot method.

Also, in the present invention, the "attachment face" includes an outer panel and an inner panel forming a body panel of an auto body, an interior material such as a roof trim and the like mounted on the aforementioned panels, and additionally, similar members thereof. Also, among the wall portions partitioning the storage portion, the "bottom wall" designates a portion directly below the cavity of the storage portion, and specifically, directly below the inner face wherein the cavity inside the storage portion becomes the deepest. Also, the "inclined face" of the present invention is not limited to a flat inclined face, and is used in a broad meaning including an inclined face curving slightly in an upper convex shape or a lower convex shape.

The aforementioned present invention may be formed in the aforementioned aspects.

First, in a case wherein the upper wall includes the inclined face of which the inner face on the storage-portion side is inclined toward the bottom-wall side so as to gradually approach the lower wall, the inclined face is formed to gradually narrow toward the outer side wall. According to this aspect, by improving a flow of the molten resin toward an end side of the outer side wall, a thick wall portion and a hollow corresponding to the inclined face of the upper wall can be easily formed.

Secondly, in a case wherein the upper wall includes the inclined face of which the inner face on the storage-portion side is inclined toward the bottom-wall side so as to gradually approach the lower wall, there is included the inclined face positioned between the inner face of the inner side wall and the inner face of the upper wall, and gradually inclined in a direction separating from the inner face of the inner side wall toward the bottom wall from the upper side. According to this aspect, in proportion to a size of the hollow, reduction of a use resin amount is made together with the weight reduction, so that the inner side wall having a thin wall with rigidity can be formed.

Thirdly, in a case of including the inclined face inclining toward the bottom wall between the inner face of the inner side wall and the inner face of the bottom wall, the inclined face is formed in such a way so as to gradually narrow toward the lower wall. According to this aspect, the molten resin easily flows to an end side of the inner side wall further, so that the thick wall portion and the hollow corresponding to the inclined face between the inner face of the inner side wall and the inner face of the bottom wall can be formed further reliably.

Effect of the Invention

In the present invention, in a use state and a non-use state, the holding tool becomes difficult to be viewed so as to excel in appearance characteristics.

In the present invention, among the wall portions partitioning the storage portion, in the case wherein the upper wall includes the inclined face of which the inner face on the storage-portion side is inclined toward the bottom-wall side so as to gradually approach the lower wall, the molten resin is positively guided to a portion on the inclined face so as to easily form the thick wall portion, and the hollow can be easily formed into the thick wall portion from the hollow portion of the holding portion and the curved portion such that a gas penetrates through an inside thereof. As a result, in proportion to a size of the hollow, the reduction of the use resin amount is made together with the weight reduction, so that the outer side wall having the thin wall with rigidity can be formed.

In the present invention, among the wall portions partitioning the storage portion, in the case of including the inclined face inclining toward the bottom wall between the inner face on the inner side wall and the inner face of the bottom wall, the molten resin is positively guided to the portion on the inclined face so as to easily form the thick wall portion, and the hollow can be easily formed into the thick wall portion from the hollow portion of the holding portion and the curved portion such that the gas penetrates through the inside thereof. As a result, in proportion to the size of the hollow, the reduction of the used resin amount is made together with the weight reduction, so that the inner side wall having the thin wall with rigidity can be formed.

BRIEF DESCRIPTION OF THE DRAWINGS

FIGS. 2(*a*) and 2(*b*) show details of the assist grip in FIG. 1, wherein FIG. 2(*a*) is a rear view of the assist grip at a storage position; and FIG. 2(*b*) is a cross-sectional view taken along a line C-C in FIG. 2(*a*).

FIG. 3(*a*) is a cross-sectional view taken along a line A-A in FIG. 2(*a*); and FIG. 3(*b*) is a cross-sectional view taken along a line B-B in FIG. 2(*a*).

FIGS. 4(*a*) to 4(*c*) show details of a grip main member in FIG. 1, wherein FIG. 4(*a*) is a rear view; FIG. 4(*b*) is a bottom view; and FIG. 4(*c*) is a front view.

FIG. 5(*a*) is a schematic perspective view of the grip main member; and FIG. 5(*b*) is a cross-sectional view taken along a line F-F in FIG. 5(*a*).

FIG. 6(*a*) is an enlarged cross-sectional view taken along a line A1-A1 in FIG. 4(*a*); and FIG. 6(*b*) is an enlarged cross-sectional view taken along a line A2-A2 in FIG. 4(*a*).

FIG. 7(*a*) is an enlarged cross-sectional view taken along a line B1-B1 in FIG. 4(*a*); and FIG. 7(*b*) is an enlarged cross-sectional view taken along a line B2-B2 in FIG. 4(*a*).

BEST MODES OF CARRYING OUT THE INVENTION

Hereinafter, an embodiment of the present invention will be explained with reference to drawings. In the explanation, after an overall structure of an assist grip is clarified, essential parts and features of the device of a gas assist molding method will be described.

(Overall structure) As shown in FIG. 1 to FIG. 3(b), the assist grip of the embodiment comprises a grip main member 1 integrally including a holding portion 10, and concave storage portions 2 and 3 provided to be connected to both ends of the holding portion 10 through curved portions 14; and holding tools 4 and 5 turnably supported in the respective storage portions 2 and 3, and the assist grip is attached relative to an attachment face 6 on an auto body side by the holding tools 4 and 5. Also, the storage portions 2 and 3 have different detailed shapes, and are asymmetric. The holding tools 4 and 5 are the same in terms of comprising holding members 40 and 50, clips 42 and 52 attached to the holding members 40 and 50, and covers 44 and 54. A coil spring 46, which urges one of the holding tool 4 or the grip main member 1 so as to relatively turn relative to the other of the holding tool 4 or the grip main member 1, is arranged between the storage portion 2 and the holding tool 4. A damper 56 which reduces a turning speed of the grip main member 1 is arranged between the storage portion 3 and the holding tool 5.

Figure 8:
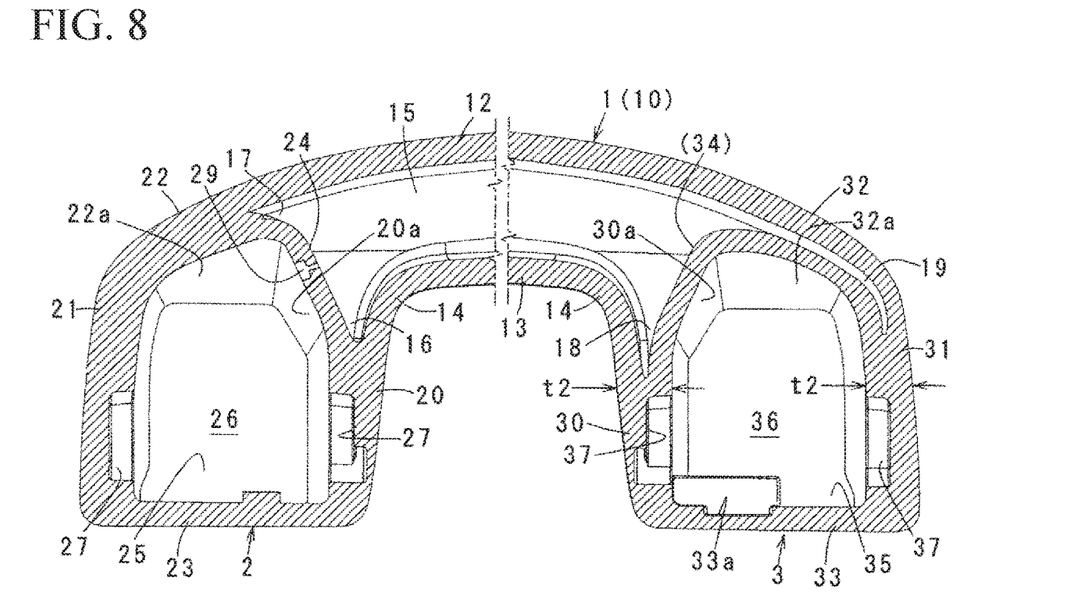
FIG. 8 is an enlarged cross-sectional view taken along a line E-E in FIG. 4(b).

There, as shown in FIG. 4(a) to FIG. 8, the grip main member 1 comprises a hollow molding member made by the gas assist molding method. The holding portion 10 has an approximately rectangular frame shape in cross section (see FIG. 5(b)), and an inner portion thereof has a relatively large hollow portion 15 up to the curved portions 14 on both sides (see FIG. 8). The storage portions 2 and 3 have a concaved shape in which a back face side is open. Cavities 26 and 36 inside the concaved shape are partitioned by an inner side wall 20 or 30 and an outer side wall 21 or 31, which face each other in a longitudinal direction; an upper wall 22 or 32 in which an upper side of inner and outer walls connects to a curved-portion 14 side; a lower wall 23 or 33 connecting both lower portions of the inner and outer side walls; and a bottom wall 25 or 35 connecting to the inner and outer side walls 20 and 21 or 30 and 31; and the upper and lower walls 22 and 23 or 32 and 33 on an outer face side. Incidentally, the reference numerals 24 and 34 in FIG. 8 represent dividing walls dividing the cavity 26 or 36 and the hollow portion 15 in the upper walls 22 and 32.

Figure 4A:
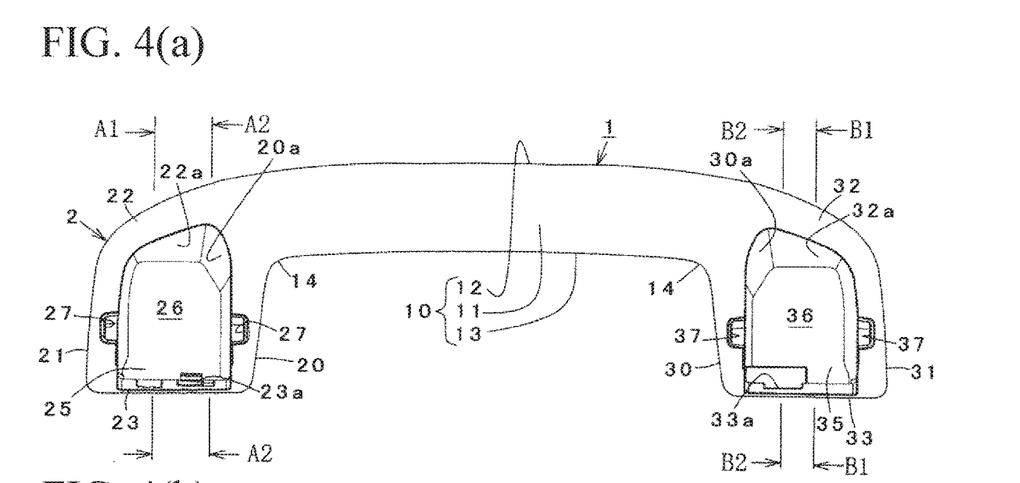
Figure 4B:
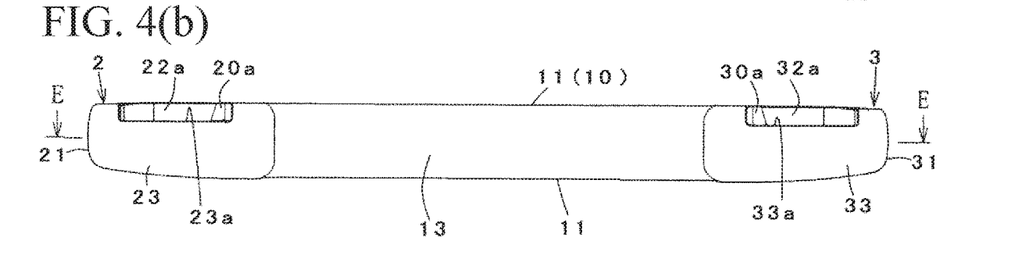
Figure 4C:
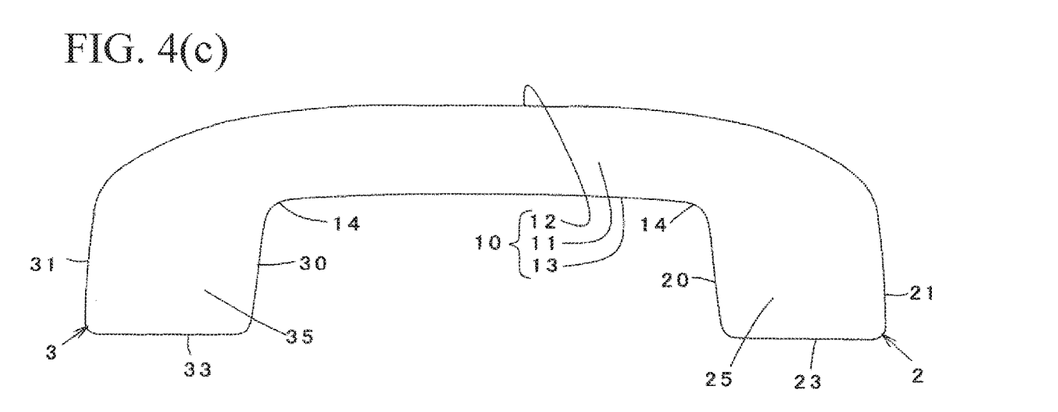
Figure 5A:
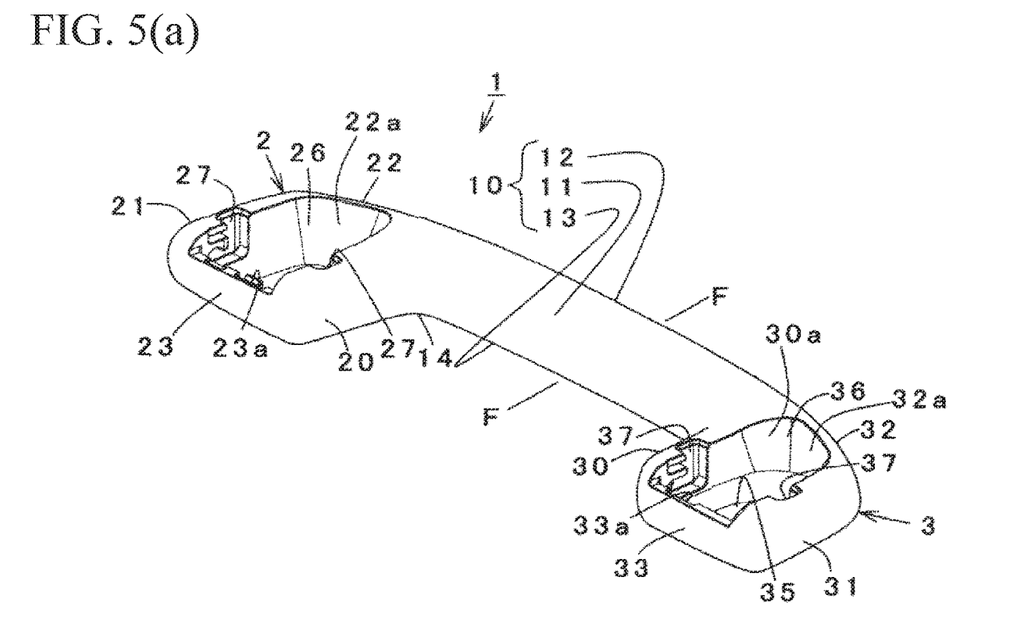
Figure 5B:
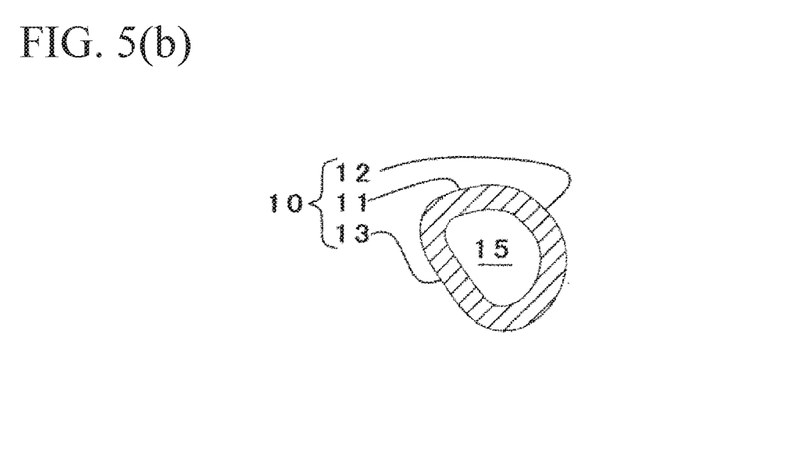
Figure 6A:
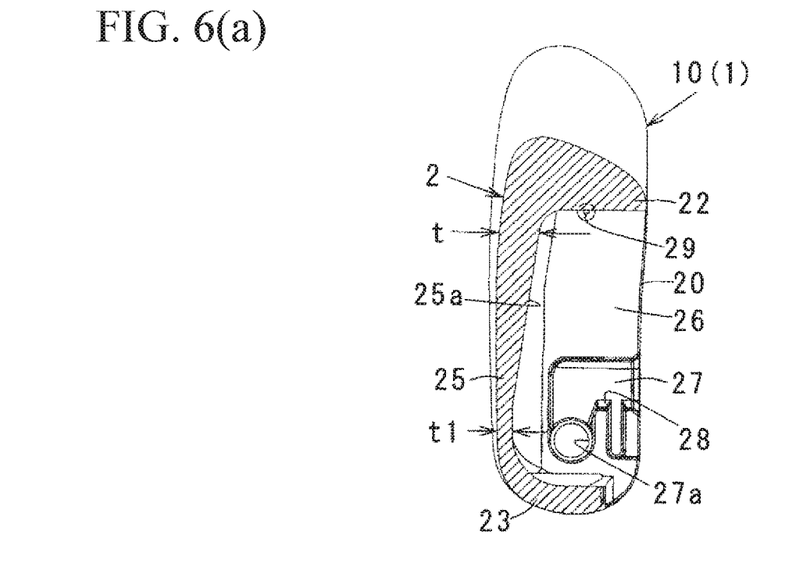
Figure 6B:
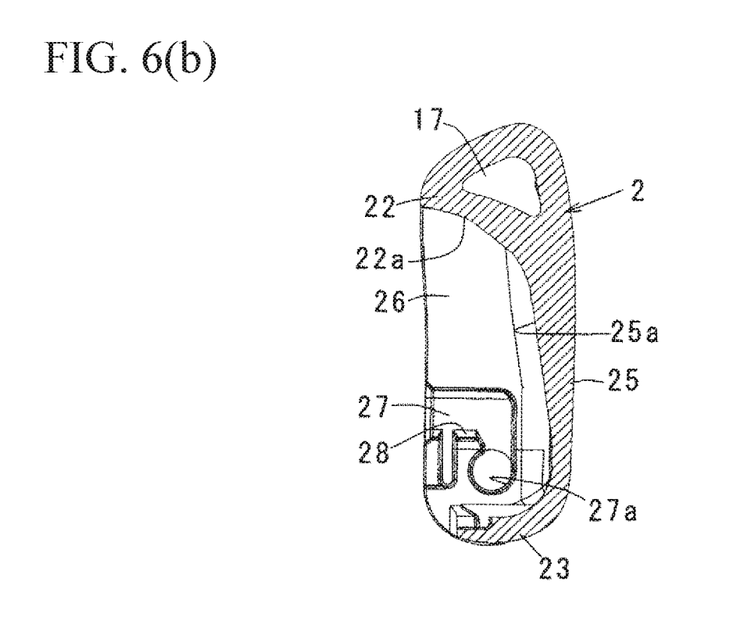

On faces facing each other of the inner and outer side walls, there are provided support grooves 27 and 37 facing each other. As shown in FIGS. 6(a) and 6(b), the support grooves 27 and 37 have an approximately reverse L shape, and include insertion grooves extending to a bottom wall side from an opening edge, and bearing holes 27a and 37a provided at curved portions from the insertion grooves. The reference numerals 28 and 38 represent elastic locking pieces partitioning one portion of the bearing holes 27a and 37a. Also, in the lower wall 23 of the storage portion 2, as shown in FIG. 4(b), there is provided a spring locking step 23a at one portion on an inner face side. In the lower wall 33 and the bottom wall 35 of the storage portion 3, there is provided a step portion 33a abutting against a corresponding portion of the damper 56, i.e. a convex portion 56c provided in the later-described outer cylinder 56a at one portion on the inner face side.

The holding members 40 and 50 include substrate portions 40a and 50a; shaft portions 40b and 50b protruding on both sides of each substrate portion; approximately tongue-shaped leg portions 40c and 50c protruding on a lower side of each substrate portion; and projections 40d and 50d provided at protruding ends of the leg portions 40c and 50c. Then, in the holding members 40 and 50, the clips 42 and 52 are assembled in such a way so as to interpose the leg portions 40c and 50c, and the covers 44 and 54 are mounted in such a way so as to cover corresponding inner sides.

The clips 42 and 52 have an approximately U shape made of metal, and comprise both plate portions 42b and 52b facing each other; and intermediate portions 42a and 52a having engagement holes connecting the two plate portions. In the respective two plate portions 42b and 52b, there are provided elastic claws 42c and 52c partitioned by approximately C-shaped slits; and latching holes (not shown in the drawings) which open to face an upper side thereof.

Figure 1:
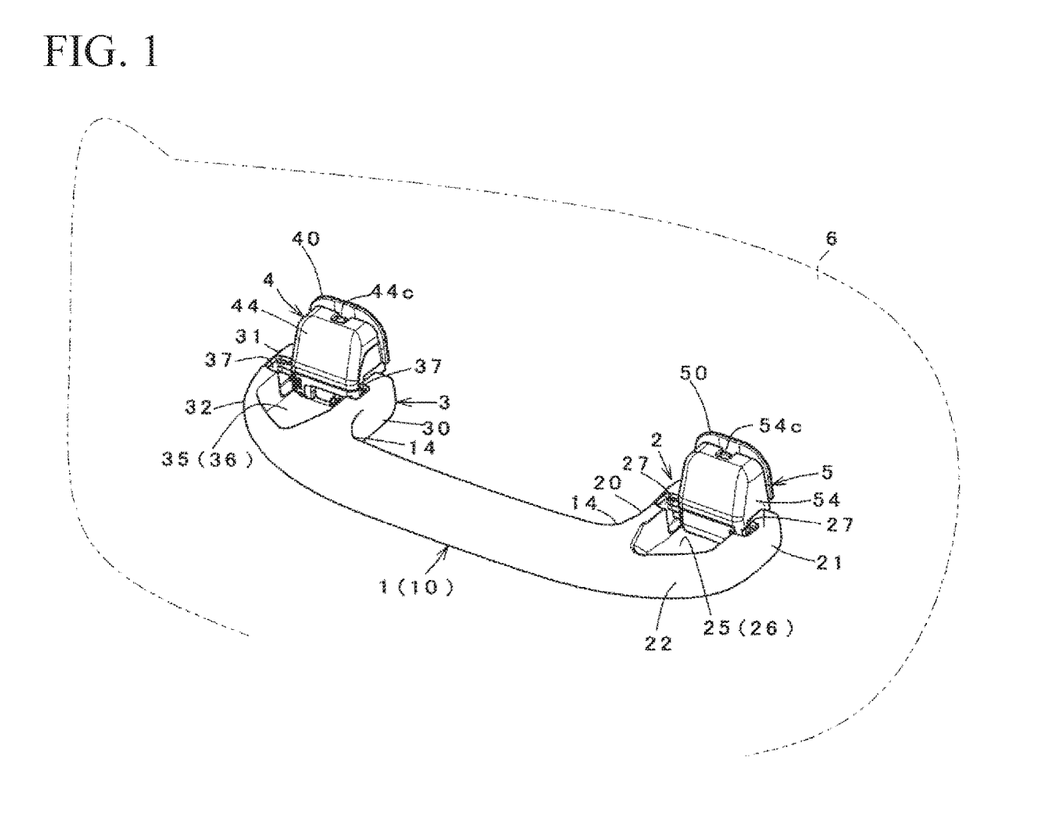
FIG. 1 is an external view showing an assist grip in a used state according to an embodiment of the invention.
Figure 2A:
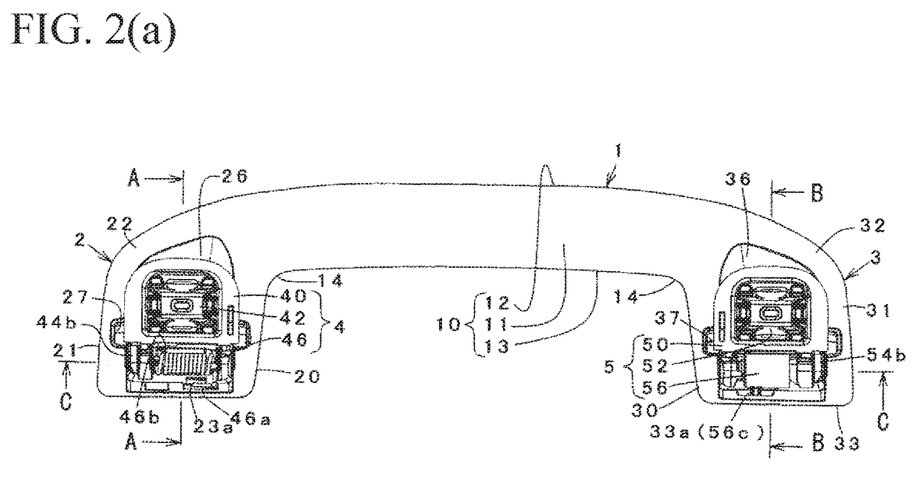
Figure 3A:
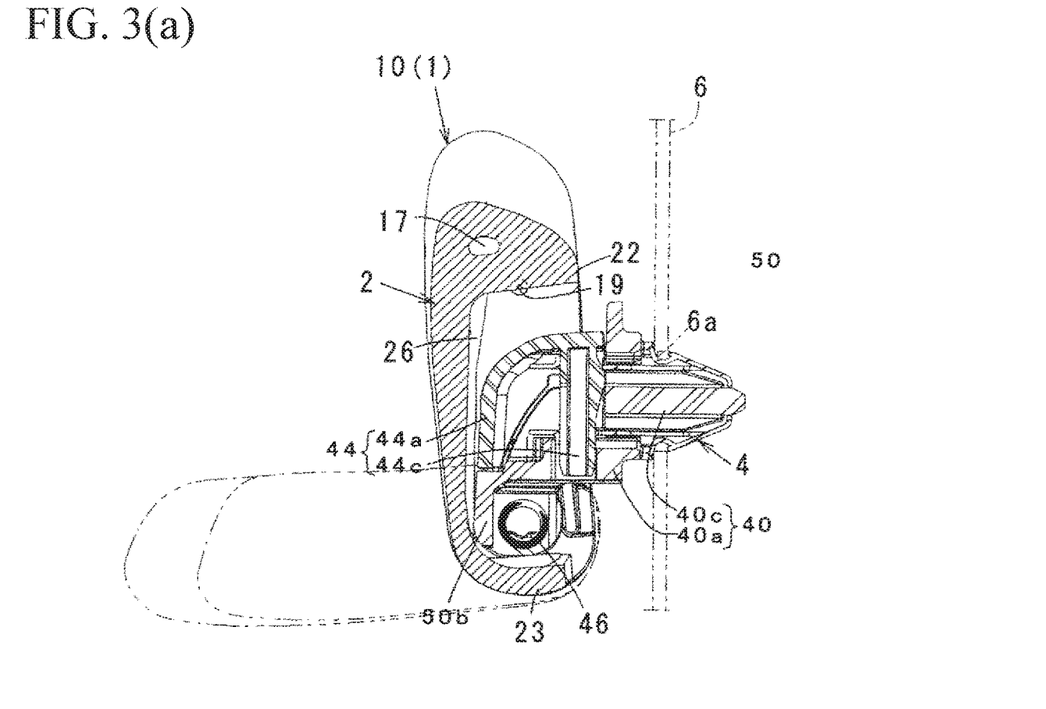
Figure 3B:
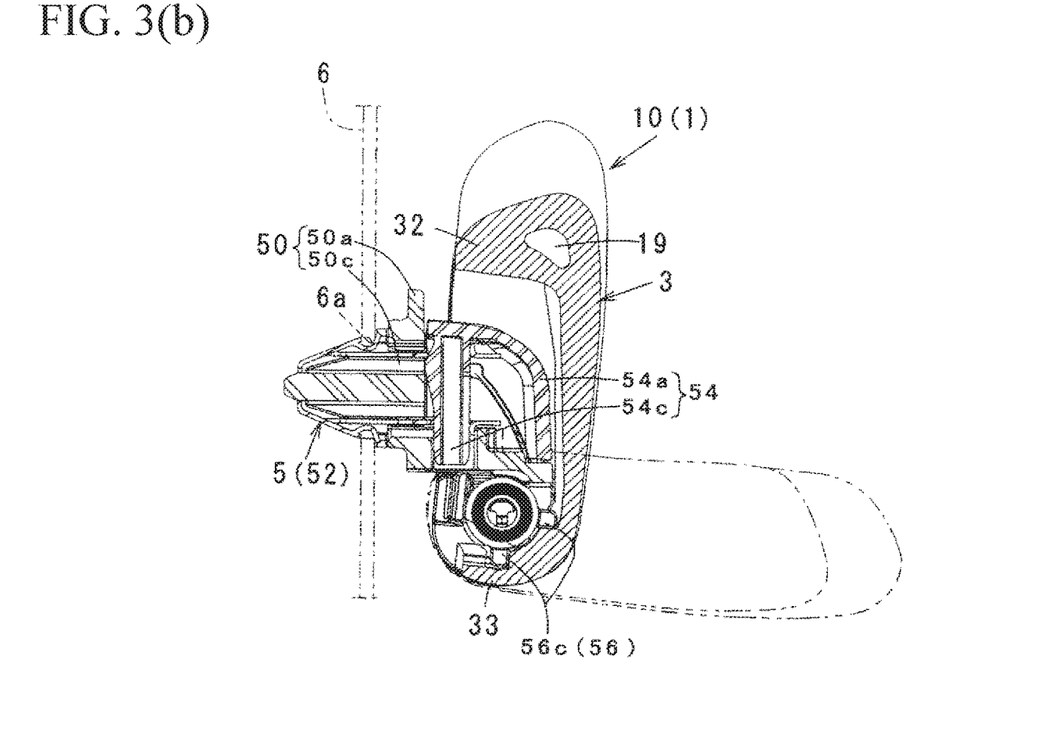

The covers 44 and 54 include main members 44a and 54a which cover the substrate portions 40a and 50a; and as shown in FIG. 2(a) and FIGS. 3(a) and 3(b), attachment piece portions 44b and 54b and locking arm portions 44c and 54c protruding on the inner face side. Then, in the covers 44 and 54, the locking arm portions 44c and 54c press-contact holes on clip plate portion sides (not shown in the drawings) relative to the substrate portions 40a and 50a, and in the attachment piece portions 44b and 54b, concave portions at a tip thereof engage corresponding shaft portions 40b and 50b so as to be mounted. In a mounted state, the clips 42 and 52 are retained by the locking arm portions 44c and 54c inserted into holes of the substrate portions to pass through in a skewered state.

Figure 2B:
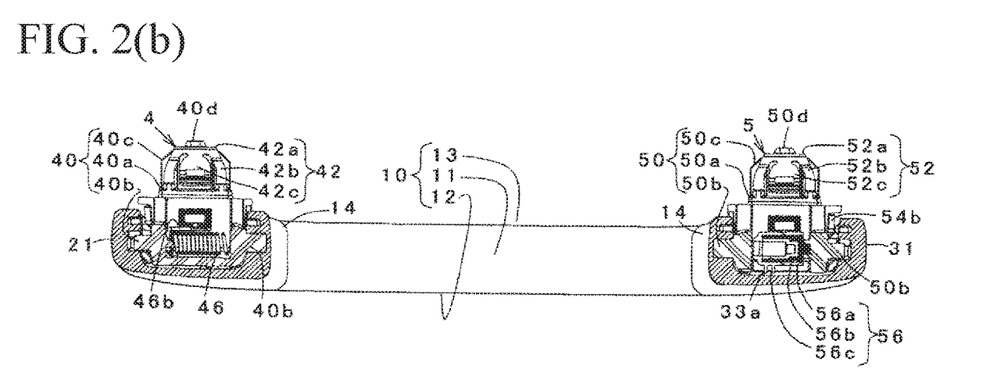

The holding tools 4 and 5 assembled in the aforementioned manner enter into the cavities 26 and 36 of the corresponding storage portions 2 and 3 of the grip main member 1, and turnably fit and are supported relative to the bearing holes 27a and 37a where the shaft portions 40b and 50b on both sides correspond, from the support grooves 27 and 37 through the elastic locking pieces 28 and 38. Also, as shown in FIGS. 2(a) and 2(b), after the coil spring 46 is held around the corresponding shaft, one abutment portion 46b is locked in a rib (not shown in the drawings) provided in the holding member 40, and the other abutment portion 46a is locked in the aforementioned step 23a against an urging force. Then, the grip main member 1 turns by the urging force of the coil spring 46 so as to come to an unused state (a storage position shown by a continuous line in FIG. 3(a)) disposed along a panel 60.

The damper 56 comprises the outer cylinder 56a, and an inner cylinder 56b turnably fitted relative to a circular space of the outer cylinder 56a in a state wherein a fluid is contained. The outer cylinder 56a includes two convex portions 56c (see FIG. 3(b)) provided on an outer circumference, and engaging the step portion 33a so as to integrally turn with the grip main member 2. The inner cylinder 56b includes a convex closing end portion (not shown in the drawings). Then, the damper 56 is incorporated relative to the storage portion 3 in a state wherein one end opening of the outer cylinder 56a turnably engages a convex portion of the holding member 50, and the closing end portion of the inner cylinder 56b engages and fits in a concaved shape of the holding member 50.

As shown in FIGS. 3(a) and 3(b), the aforementioned assist grip is mounted relative to the panel by engaging the clips 42 and 52 of each holding tool with two attachment holes 6a provided in a body panel 6. In that case, the body panel 6 is covered by a roof trim (not shown in the drawings), and the holding tools 4 and 5 are disposed on the roof trim thereof. Then, the grip main member 1 is operated to turn from the storage position shown by the continuous line to a use position shown by dashed lines against the urging force of the coil spring 46, and when one's hand is released at the use position, the grip main member 1 turns again to the storage position by the urging force of the coil spring 46. At that time, the grip main member 1 turns by maintaining a state wherein one convex portion 56c on the outer cylinder abuts against a corresponding end face of the step portion 33a. As a result, the outer cylinder 56a of the damper is braked together with the grip main member 1 while receiving a fluid resistance relative to the inner cylinder 56b so as to turn slowly.

Figure 10A:
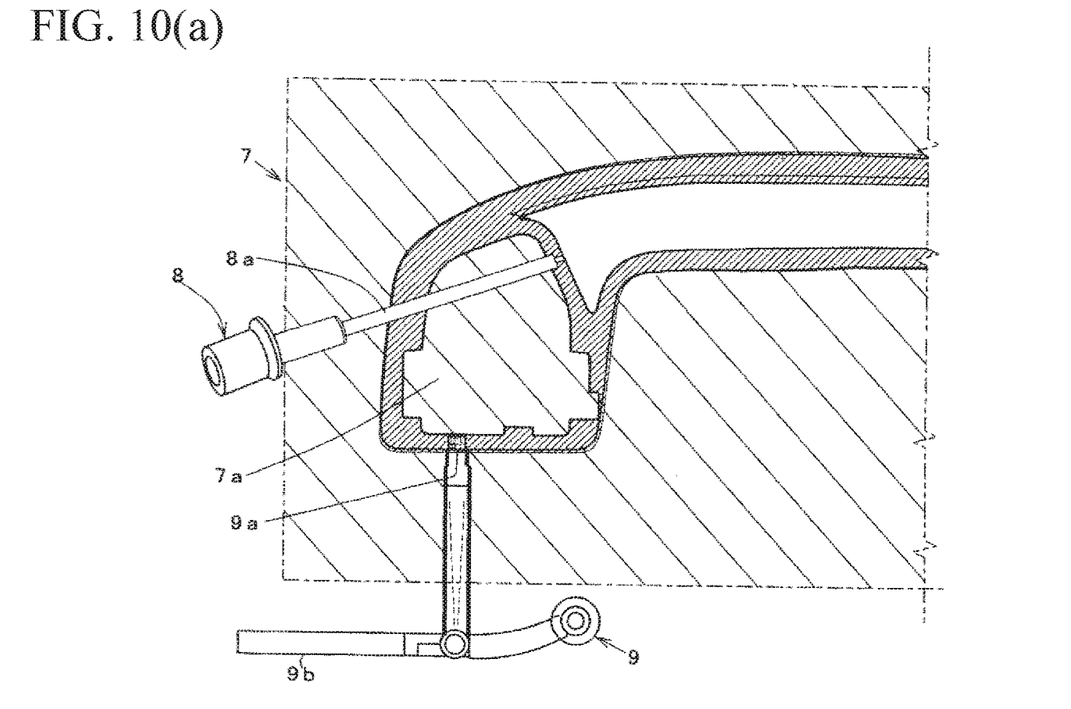
FIGS. 10(a) and 10(b) are schematic structural views for explaining molding essential parts of the grip main member.
Figure 10B:
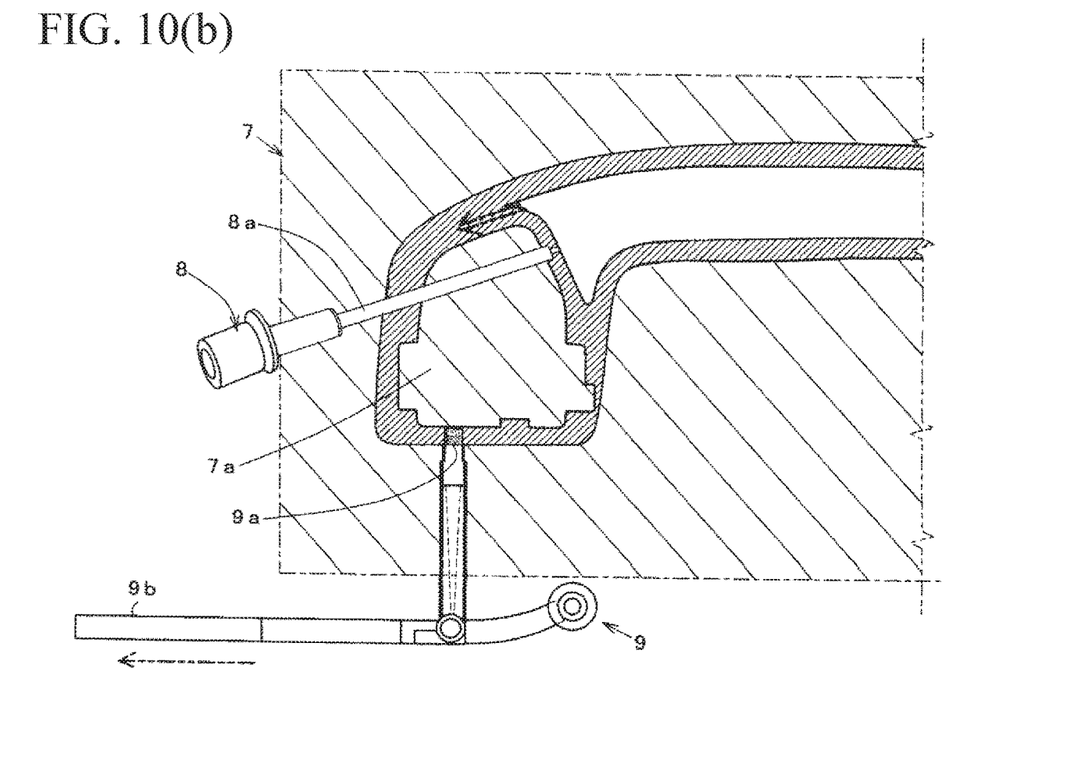

(Essential parts and assist molding method) The aforementioned grip main member 1 is made by the assist molding method. In molding procedures, a forming die 7 shown in FIGS. 10(a) and 10(b) is used, and after an appropriate amount of molten resin (in this example, although polypropylene which is a thermoplastic resin is used, other resins such as resins shown in Patent Documents 1 and 2 may be used) is injected into a cavity of the forming die 7 from an injection opening 9a which is a gate of a resin injection device 9, in an uncured state, gas such as nitrogen and the like which is pressurized to a predetermined pressure by a nozzle 8a of a fluid injection device 8 is injected, and while forming a gas passageway which becomes a hollow portion inside the molten resin, the resin is pressed against a cavity surface side from an inside. The aforementioned molding procedures are the same as the molding method shown in the Patent Documents 1 and 2.

The features of the device especially reside in that (A) a structure wherein a tip of the nozzle 8a of the fluid injection device is disposed in an expected portion for forming the dividing wall 24; (B) a structure wherein the injection opening 9a which is the gate is disposed in an expected portion for forming the lower wall 23; and furthermore (C) a structure wherein by devising an outer face shape of the storage portion 3 and the like as described below, the hollow portion 15 which is considerably large from the holding portion 10 formed as shown in FIG. 8 toward the curved portions 14, and cavities 18 and 19 extending toward a lower wall 33 side from an upper wall 32 side can be easily formed by a gas injection at a molding time in a state wherein the cavities 18 and 19 are branched from the hollow portion 15 into thicknesses of the inner side wall 30 and the outer side wall 31. Hereinafter, characteristics of the aforementioned structures will be clarified.

Regarding (A), the tip of the nozzle 8a of the fluid injection device is disposed in the corresponding portion for forming the dividing wall 24 from a mold part 7a corresponding to the cavity 26 of the storage portion, so that a hole 29 (see FIG. 6(a)) at an injection time, which is formed after molding, is exposed at a portion which is most difficult to be viewed in the cavity 26 of the storage portion 2. Consequently, in this structure, the hole 29 cannot be viewed in both the use position and an non-use position of the assist grip so as to improve appearance characteristics compared to the Patent Documents 1 and 2.

Regarding (B), compared to the structure wherein the molten resin is injected from a center portion of the cavity as shown in the Patent Documents 1 and 2, the injection opening 9a of the molten resin is set in the portion for forming the lower wall 23 of the storage portion 2 so as to excel in the appearance characteristics. Additionally, at the molding time, as schematically shown in FIG. 10(b), the injection of the molten resin from the injection opening 9a which is the gate completes, and a slide pin 9b, which slides by an oil-hydraulic cylinder and the like (not shown in the drawings) at a time of gas injection, is operated to control injected gas in such a way so as to pour the injected gas in an arrow direction of FIG. 10(b), so that one portion of the resin flows backward to a liner side just in front of the injection opening by a gas pressure, and the cavity 17 or/and the cavity 16 on the aforementioned storage-portion 2 side is further enlarged so as to be effective for further weight reduction as well.

Figure 9:
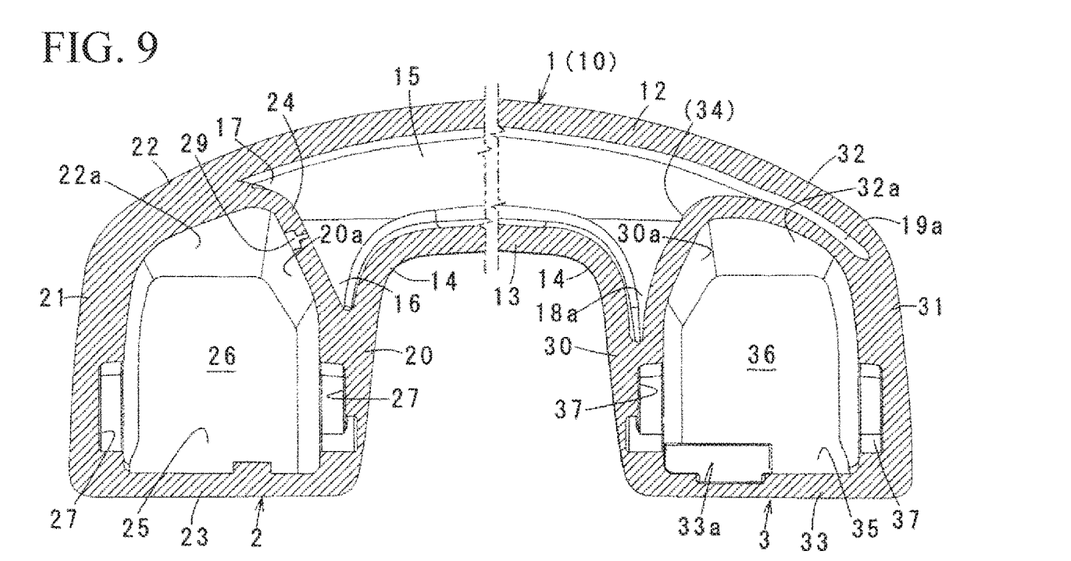
FIG. 9 is a drawing showing another example of FIG. 8 corresponding to FIG. 8.

Regarding (C), when the grip main member 1 is formed by the gas assist molding, the cavities 18 and 19 are formed as large as possible in the inner and outer side walls 30 and 31 within a range wherein rigidity of the storage portion 3 is not impaired so as to significantly reduce a use amount of a resin material together with the weight reduction. The present inventor repeatedly examined in order to form the cavities 18 and 19 extending toward the lower-wall 33 side from the upper-wall 32 side in the state wherein the cavities 18 and 19 are branched from the hollow portion 15 into the thicknesses of the inner side wall 30 and the outer side wall 31. As a result, as schematically shown in FIG. 8 and FIG. 9, the present inventor obtained conclusive evidence of the following conditions which become essential. Incidentally, in cross-sectional views of FIG. 8 and FIG. 9, among grip main members made in experiments regarding shapes of the cavities 18 and 19, representative examples are shown in the drawings. Although a cavity 18a in FIG. 9 is formed slightly wider than the cavity 18 in FIG. 8, a cavity 19a in FIG. 9 is formed slightly shorter than the cavity 19 in FIG. 8 in a length manner. This shows that the shapes of the cavities 18 and 19 or the cavities 18a and 19a slightly change according to injection conditions.

First, among the wall portions partitioning the cavity 36 (26) of the storage portion, it is important that on an inner face of the upper wall 32 (22) on a storage-portion side, at least one portion includes an inclined face 32a (22a) inclining toward a bottom-wall 35 (25) side so as to gradually approach the lower wall 33 (23). This structure was understood from the experiments carried out by changing the shapes, and when the inner face of the upper wall on the storage-portion side includes the inclined face 32a (22a) inclining toward the bottom-wall side so as to gradually approach the lower wall, the molten resin is positively guided to the portion on the inclined face thereof, so that a thick wall portion which is relatively thick can be easily made, and the cavity 18 or/and the cavity 19 can be easily formed into the thick wall portion from the hollow portion 15 of the holding portion 10 and the curved portion 14 such that the gas breaks through the thick wall portion thereof. As a result, as the grip main member 1, in proportion to a size of the cavity 18 or/and the cavity 19, a reduction of a use resin amount is made together with the weight reduction, so that the outer side wall having a thin wall with rigidity can be formed.

Also, among the wall portions partitioning the cavity 36 (26) of the storage portion, it is important that at least one portion includes an inclined face 30a (20a) inclining toward the bottom wall between an inner face of the inner side wall 30 (20) and an inner face of the bottom wall 35 (25), i.e. the inclined face 30a (20a) positioned between the inner face of the inner side wall 30 (20) and the inner face of the upper wall 32 (22), and inclining in a direction gradually separating from the inner face of the inner side wall toward the bottom wall 35 (25) on the lower side from the upper side. This structure was also understood from the experiments carried out by changing the shapes, and when there is included the inclined face 30a (20a) inclining toward the bottom wall between the inner face of the inner side wall and the inner face of the bottom wall, the molten resin is positively guided to the portion on the inclined face thereof, so that the thick wall portion which is relatively thick can be easily made, and the cavity 18 or/and the cavity 19 can be easily formed into the thick wall portion from the hollow portion 15 of the holding portion 10 and the curved portion 14 such that the gas breaks through the thick wall portion thereof. As a result, as the grip main member 1, in proportion to the size of the cavity 18 or/and the cavity 19, the reduction of the used resin amount is carried out together with the weight reduction, so that the outer side wall having the thin wall with rigidity can be formed.

Moreover, from the experiments, it is proved that the following structures are important as well. First, as the inclined face 32a (22a) of the aforementioned upper wall 32(22), as inferred from FIG. 8, the inclined face 32a (22a) gradually becomes narrower to some extent toward the outer side wall 31 (21). In this structure, it is conceivable that by setting the shape in such a way so as to improve a flow of the molten resin toward an outer-side-wall end side as much as possible, the thick wall portion and the cavity 18 or/and the cavity 19 corresponding to the inclined face 32a (22a) of the upper wall can be easily formed further. In a similar manner, the aforementioned inclined face 30a (20a) gradually becomes narrower to some extent toward the lower wall 33 (23). In this structure, it is conceivable that by setting the shape in such a way so as to improve the flow of the molten resin toward an inner-side-wall end side as much as possible, the thick wall portion and the cavity 18 or/and the cavity 19 corresponding to the inclined face 30a (20a) between the inner face of the inner side wall and the inner face of the bottom wall can be easily formed further.

Figure 7A:
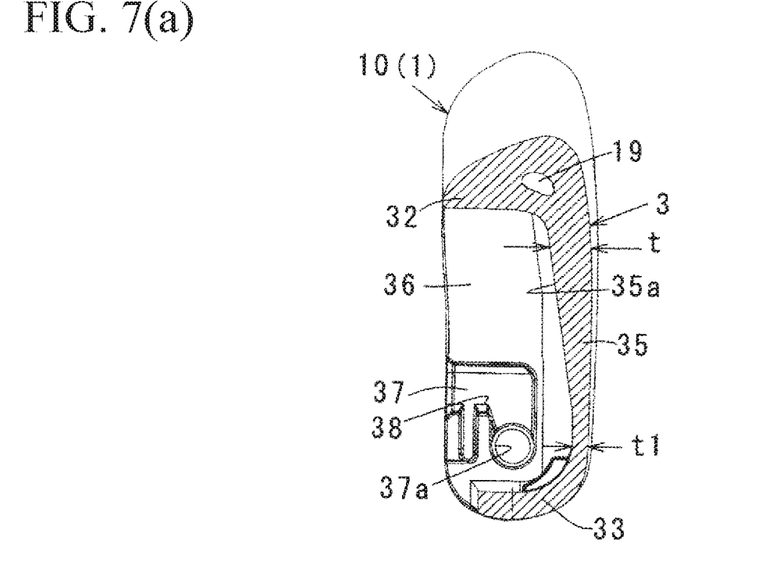
Figure 7B:
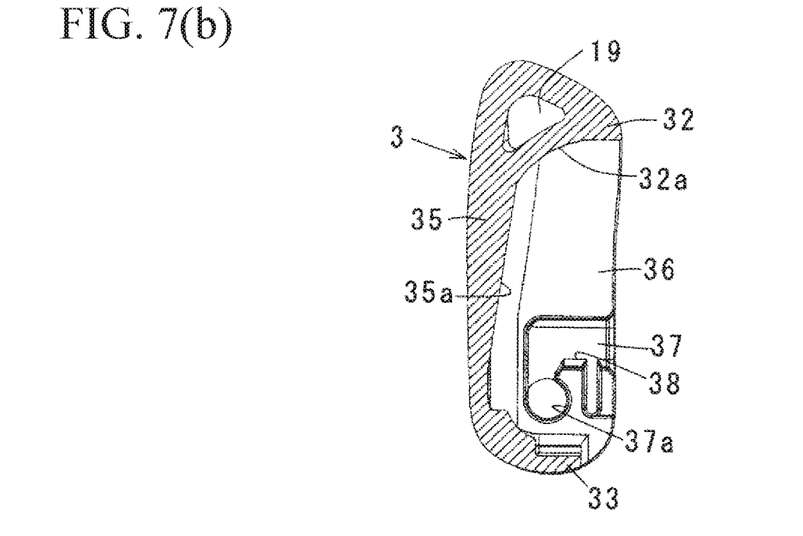

Furthermore, the aforementioned grip main member 1 has the aforementioned structures, and is set as follows. Regarding the thickness of the bottom wall 35, as shown in FIG. 7(a), the thickness of the bottom wall 35 is formed to gradually become thinner as moving to a thickness t1 on the lower-wall 33 side from a thickness t on the upper-wall 32 side. In this regard, the bottom wall 35 is set in a thickness wherein the cavity is difficult to be formed by the gas injection into the thickness, so that for that thickness, in the inner and outer side walls 30 and 31, the cavity can be easily formed by the gas injection into the thickness. In a similar manner, in the inner and outer side walls 30 and 31, as shown in FIG. 8, at least the thickness t2 of an upper side portion is set to be approximately the same or thicker compared to the thickness t of an upper-wall-side portion of the bottom wall 35, i.e. in FIG. 7(a) and FIG. 8, set to be t2≥t. The aforementioned knowledge is also obtained from the results of the experiments, and it is conceivable that the injected gas solely enters and advances into the thickness of the inner and outer side walls 30 and 31 so as to have the structures effective for forming the relatively large cavity 18 or/and cavity 19 within a range wherein the rigidity is not impaired.

Incidentally, details of the assist grip of the present invention can be variously modified or developed with reference to the embodiments and the like provided that the assist grip of the present invention includes the structures specified in the invention. Regarding the holding tool, it is not limited to the holding tool used in the embodiments, and for example, the holding tool may be changed to structures disclosed in Japanese Unexamined Patent Application Publication No. 2003-200770, Japanese Unexamined Patent Application Publication No. 2011-25762, Japanese Unexamined Patent Application Publication No. 2013-169961, and the like. Moreover, a structure wherein a latching hook is additionally provided using a holding tool disclosed in Japanese Unexamined Patent Application Publication No. 2015-174516 and the like may be used.

EXPLANATION OF SYMBOLS

1 . . . a grip main member
2 . . . a storage portion
3 . . . a storage portion
4 . . . a holding tool (40 is a holding member, and 42 is a clip.)
5 . . . a holding tool (50 is a holding member, and 52 is a clip.)
6 . . . a panel (an attachment face)
7 . . . a forming die
8 . . . a fluid injection device
9 . . . a resin injection device
10 . . . a holding portion (11 are side walls, 12 is an upper wall, and 13 is a lower wall.)
14 . . . curved portions
15 . . . a hollow portion of a holding portion
20 . . . an inner side wall (20a is an inclined face.)
21 . . . an outer side wall
22 . . . an upper wall (22a is an inclined face, and 29 is a hole at an injection time.)
23 . . . a lower wall (23a is a step portion.)
24 . . . a dividing wall between the hollow portion and a cavity portion.
25 . . . a bottom wall (25a is an inclined face.)
26 . . . a cavity
27 . . . a support groove (27a is a bearing hole.)
30 . . . an inner side wall (30a is an inclined face.)
31 . . . an outer side wall
32 . . . an upper wall (32a is an inclined face.)
33 . . . a lower wall (33a is a step.)
34 . . . a dividing wall between the hollow portion and the cavity portion
35 . . . a bottom wall (35a is an inclined face.)
36 . . . a cavity
37 . . . a support groove (37a is a bearing hole.)

Incidentally, all contents of the specification, claims, drawings, and abstract of Japanese Patent Application No. 2016-242575 filed on Dec. 14, 2016 are cited in their entireties herein and are incorporated as a disclosure of the specification of the present invention.

What is claimed is:

1. An assist grip comprising a hollow molding member in which a grip main member is formed by a gas assist molding method; integrally including a holding portion, and concave storage portions provided to be connected to two longitudinal ends of the holding portion by interposing curved portions; and attached to an attachment-face side by holding tools supported in the two storage portions, wherein each of the storage portions is partitioned by an inner side wall and an outer side wall facing each other in a longitudinal direction; an upper wall connecting upper sides of the two side walls at a curved-portion side; a lower wall connecting lower sides of the two side walls at a terminal side; and a bottom wall connecting to the inner and outer side walls and the upper and lower walls at an outer face side, and the upper wall includes an inclined face wherein an inner face on a storage-portion side is inclined toward a bottom-wall side so as to gradually approach the lower wall, or an inclined face inclining toward the bottom wall between an inner face of the inner side wall and an inner face of the bottom wall.

2. An assist grip according to claim 1, wherein in a case where the upper wall includes the inclined face wherein the inner face on the storage-portion side is inclined toward the bottom-wall side so as to gradually approach the lower wall, the inclined face is formed to gradually narrow toward the outer side wall.

3. An assist grip according to claim 1, wherein in a case where the upper wall includes the inclined face wherein the inner face on the storage-portion side is inclined toward the bottom-wall side so as to gradually approach the lower wall, the upper wall includes the inclined face inclining toward the bottom wall between the inner face of the inner side wall and the inner face of the bottom wall.

4. An assist grip according to claim 1, wherein in a case where the upper wall includes the inclined face inclining toward the bottom wall between the inner face of the inner side wall and the inner face of the bottom wall, the inclined face is formed in such a way so as to gradually narrow toward the lower wall.

* * * * *